United States Patent
Lin et al.

(10) Patent No.: US 9,745,072 B2
(45) Date of Patent: Aug. 29, 2017

(54) FRONT INSTALLATION NODE INTEGRATED WITH AIRCRAFT PYLON

(71) Applicants: COMMERCIAL AIRCRAFT CORPORATION OF CHINA, LTD, Shanghai (CN); COMMERCIAL AIRCRAFT CORPORATION OF CHINA, LTD SHANGHAI AIRCRAFT DESIGN AND RESEARCH INSTITUTE, Shanghai (CN)

(72) Inventors: Guozheng Lin, Shanghai (CN); Yinyin Hu, Shanghai (CN); Sen Peng, Shanghai (CN); Qifeng Yu, Shanghai (CN); Yaoyu Fan, Shanghai (CN)

(73) Assignees: COMMERCIAL AIRCRAFT CORPORATION OF CHINA, LTD, Shanghai (CN); COMMERCIAL AIRCRAFT CORPORATION OF CHINA, LTD SHANGHAI AIRCRAFT DESIGN AND RESEARCH INSTITUTE, Shanghai (CN)

( * ) Notice: Subject to any disclaimer, the term of this patent is extended or adjusted under 35 U.S.C. 154(b) by 0 days.

(21) Appl. No.: 14/407,545

(22) PCT Filed: Dec. 6, 2013

(86) PCT No.: PCT/CN2013/088807
§ 371 (c)(1),
(2) Date: Dec. 12, 2014

(87) PCT Pub. No.: WO2014/121632
PCT Pub. Date: Aug. 14, 2014

(65) Prior Publication Data
US 2015/0166188 A1 Jun. 18, 2015

(30) Foreign Application Priority Data

Feb. 6, 2013 (CN) .......................... 2013 1 0048335

(51) Int. Cl.
*B64D 27/26* (2006.01)
(52) U.S. Cl.
CPC ........ *B64D 27/26* (2013.01); *B64D 2027/266* (2013.01); *Y02T 50/44* (2013.01)
(58) Field of Classification Search
CPC .............. B64D 27/26; B64D 2027/262; B64D 2027/266; B64D 2027/268
See application file for complete search history.

(56) References Cited

U.S. PATENT DOCUMENTS

| 5,620,154 A | * | 4/1997 | Hey | ........................ | B64D 27/18 244/54 |
| 6,330,995 B1 | * | 12/2001 | Mangeiga | ............. | B64D 27/26 244/54 |

(Continued)

FOREIGN PATENT DOCUMENTS

| CN | 100519340 C | 7/2009 |
| CN | 101678898 | 3/2010 |

(Continued)

OTHER PUBLICATIONS

International Search Report, dated Mar. 6, 2014.
(Continued)

*Primary Examiner* — Joseph W Sanderson
*Assistant Examiner* — Christopher Hutchens
(74) *Attorney, Agent, or Firm* — Hamilton, Brook, Smith & Reynolds, P.C.

(57) ABSTRACT

A front installation node is suitable for integral forming with a front end frame of an aircraft pylon and includes a first lug and a second lug, each respectively protruding outwardly from one of the two sides of the frond end frame; a first (Continued)

connecting rod and a second connecting rod, one end thereof being respectively connected to the first lug and the second lug, and the other end thereof being respectively suitable for connecting to an aircraft engine. The first connecting rod can pivotally connect to the first lug at a first connection point. The second connecting rod and the second lug are respectively connected at a second connecting point and a third connecting point. Using the front installation node to transmit torque is beneficial in reducing the external width of a rear installation node, reducing engine fuel consumption.

5 Claims, 5 Drawing Sheets

(56) References Cited

U.S. PATENT DOCUMENTS

| | | | |
|---|---|---|---|
| 2007/0138337 A1* | 6/2007 | Audart-Noel | B64D 27/26 244/53 R |
| 2009/0064658 A1 | 3/2009 | Beutin et al. | |
| 2011/0023450 A1 | 2/2011 | Stuart et al. | |
| 2011/0062279 A1 | 3/2011 | Welch et al. | |
| 2013/0156574 A1 | 6/2013 | Antunes et al. | |
| 2015/0122943 A1 | 5/2015 | Wu et al. | |

FOREIGN PATENT DOCUMENTS

| | | |
|---|---|---|
| CN | 101801788 A | 8/2010 |
| CN | 102076563 A | 5/2011 |
| CN | 102630272 | 8/2012 |
| CN | 103101628 A | 5/2013 |
| CN | 103112595 A | 5/2013 |
| FR | 2891244 A1 | 3/2007 |

OTHER PUBLICATIONS

International Search Report for PCT/CN2013/088807, entitled: Front Installation Node Integrated With Aircraft Pylon, dated Mar. 20, 2014 (not in English).

Non-Final Office Action dated Jan. 15, 2016, for U.S. Appl. No. 14/407,497, entitled: Integrated Pylon Structure for Propulsion System.

Final Office Action dated Jul. 15, 2016, for U.S. Appl. No. 14/407,497, entitled: Integrated Pylon Structure for Propulsion System.

Non-Final Office Action dated Mar. 10 2017, for U.S. Appl. No. 14/407,497, entitled: Integrated Pylon Structure for Propulsion System.

* cited by examiner

FRONT INSTALLATION NODE INTEGRATED WITH AIRCRAFT PYLON

FIELD OF THE INVENTION

The present invention generally relates to the technical field of civil aircraft structural design, and more specifically to a device for connecting an aero-engine with an aircraft pylon.

BACKGROUND OF THE INVENTION

A device for connecting an aero-engine with an aircraft pylon is usually called an installation joint which mainly functions to connect the engine and transfer the load of the engine to an aircraft pylon structure.

A pylon is a connection interface between an aero-engine and an airfoil and mainly functions to mount the engine, transfer engine load, provide a pathway for systems such as a fuel pipeline system, environment control system, electrical system and hydraulic system between the engine and the airfoil. The pylon structure should meet the space requirement of the inside system and ensure an excellent force transfer path. To meet the above requirement, as shown in FIG. 1, a pylon 10' in a conventional configuration is usually designed as a rigid box-shaped structure consisting of an upper beam, a lower beam, a frame having a plurality of vertical stations, and a sidewall which are connected to one another, and assembled with the engine via a front installation joint 20' and a rear installation joint 30'. The total load of the engine is transferred via the front installation joint and the rear installation joint.

FIG. 2a and FIG. 2b illustrate the front installation joint 20' and the rear installation joint 30' of FIG. 1 respectively from another perspective. As shown in FIG. 2a and FIG. 2b in combination with FIG. 1, the front and rear installation joints 20', 30' are connected to a front and rear engine connectors of the pylon respectively via four pull-receiving bolts (not shown) engaged in pull-receiving bolt holes 24' and two shear pins (not shown) engaged in shear-receiving pin holes 42'.

As shown in FIG. 2a in combination with FIG. 1, the front installation joint 20', at a rear side, is inserted into a main force-bearing box segment of the pylon 10', and connected to a front end frame, an upper beam, a lower beam and a side web of the front end frame via its bracket 25'. The front installation joint 20' mainly consists of a left front installation joint 21', a middle front installation joint 22' and a right front installation joint 23'. The left and right front installation joints 21' and 23' are connected to the engine respectively via two pull-receiving bolts to transfer vertical load; and the middle installation joint 22' is connected to the engine via two shear pins to transfer a course load and a lateral load.

As shown in FIG. 2b in combination with FIG. 1, the rear installation joint 30' of the pylon is upwardly connected to the frame of the pylon and downwardly connected to the engine. The rear installation joint 30' mainly consists of a front section and a rear section, with each section being connected to the engine respectively via two pull-receiving bolts to transfer the vertical load and engine torque, and being connected to the engine via the shear pins to transfer the course load and lateral load.

The pylon in the conventional configuration transmits torque via the rear installation joint 30'. To have an enough long arm of force to transmit torque, the rear installation joint 30' must have a larger width, which causes the shape of a rear edge of the pylon wider, affecting aerodynamic performance of the aircraft. Besides, the front installation joint 20' is an individual component independent from the pylon but connected to the pylon, and the whole engine installation structure is heavy and it is difficult to reduce fuel consumption of the engine.

SUMMARY OF THE INVENTION

An object of the present invention is to reduce structural weight through integrated design of the front installation joint and the pylon frame; another object of the present invention is to transfer the engine torque via the front installation joint other than the rear installation joint, and thereby reduce a width of the rear installation joint, facilitate reduction of an outer shape of the rear edge of the pylon and meanwhile meet high-performance and low-oil consumption requirements of large passenger airplane engines; and a third object of the present invention is to provide a front installation joint as a standby design for possible damage and security purpose.

According to one aspect of the present invention, there is provided a front installation joint integrated with an aircraft pylon, wherein the front installation joint is adapted to be integrally formed with a front end frame of the aircraft pylon and comprises:

a first lug and a second lug respectively protruding outward from two opposite sides of the front end frame; and a first link and a second link respectively connected to the first lug and the second lug at one end, and respectively adapted to be connected to the aero-engine at the other end;

wherein the first link and the first lug are pivotally connected at a first connection point, and the second link and the second lug are connected respectively at a second connection point and a third connection point.

In this aspect of the present invention, the integrated design of the front installation joint and the frame of the pylon can transmit vertical and lateral load as well as torque, overcomes the drawback of the current front installation joint about failure to transmit torque, releases the torque-transmitting function of the rear installation joint so as to reduce the width of the rear installation joint so that the rear installation joint occupies less engine duct space, which facilitates reduction of fuel consumption rate, facilitates retraction of a rear edge of the pylon and achieves reduction of aerodynamic loss. Meanwhile, the integrated design of the front installation joint and the frame of the pylon may effectively reduce the weight of the structure and lower a height of an undercarriage.

Preferably, connecting bolts running through the first link and the second link respectively at the first connection point, the second connection point and the third connection point are transition-fitted with bushings disposed at these connection points and formed in mounting holes of the first lug and the second lug.

Further preferably, the bushing at the second connection point comprises an outer bushing located in the mounting hole and an inner bushing transition-fitted with the connecting bolt, wherein inner walls of upper and lower ends of the outer bushing are planes, and outer walls of upper and lower ends of the inner bushing are planes, wherein the outer walls of the upper and lower ends of the inner bushing are transition-fitted with the inner walls of the upper and lower ends of the outer bushing, and outer walls on left and right sides of the inner bushing are clearance-fitted with inner walls on left and right sides of the outer bushing.

In a preferred embodiment, when the two bushings are fitted, upper and lower planes are transition-fitted, left and right curved surfaces are clearance-fitted so as to ensure that the second connection point only transfers the vertical load and does not transfer lateral load. The lateral load is transferred only at the first connection point and the third connection point, which is a statically defined structure and transfers a force clearly.

Further preferably, the first link is further connected to the first lug at a fourth connection point, and the fourth connection point and the second connection point are arranged opposite to each other and respectively located inside the first connection point and the third connection point, wherein a connecting bolt running through the first link at the fourth connection point is clearance-fitted with the bushing disposed in the mounting hole of the first lug at the fourth connection point.

The fourth connection point is arranged such that when the front installation joint is connected to the engine via the first link and the second link, the fourth connection point of the first link is a standby design for possible damages and security purpose.

Again further preferably, the connecting bolt at the fourth connection point is clearance-fitted with the bushing with a first clearance, and the first clearance is set in a way that when any one of the first connection point, the second connection point and the third connection point fails, the connecting bolt at the fourth connection point partially contacts with the hushing.

When any one of the first connection point, the second connection point and the third connection point fails, for example, when the second connection point fails, due to the load of the engine, a front end frame of the pylon slightly rotates about the third connection point, and then the first clearance at the fourth connection point partially disappears, i.e., the fourth connection point participates in receiving a force.

Preferably, the front installation joint of the present invention further comprises a third lug protruding outward from a front wall of the front end frame and a third link having one end connected to the third lug at a fifth connection point and the other end adapted to be connected to the engine, and a connecting bolt running through the third link at the fifth connection point is clearance-fitted with a busing disposed in a mounting hole on the third lug at the fifth connection point.

The fifth connection point is arranged such that when the front installation joint is connected to the engine via the first, second and third links, the third link is a standby design for possible damages and security purpose.

Further preferably, the connecting bolt at the fifth connection point is clearance-fitted with the bushing with a second clearance, and the second clearance is greater than the first clearance and set in a way that when the first link or the second link completely fails, the connecting bolt at the fifth connection point partially contacts with the bushing.

When the whole first link or the whole second link completely fails, the second clearance at the fifth connection point partially disappears due to the load of the engine, and the third link participates in receiving a force.

Preferably, the first connection point, the fourth connection point, the second connection point and the third connection point are arranged in a straight line so that some reverse vectors in the straight line direction offset each other.

Preferably, the fifth connection point is longitudinally located above other connection points and transversely located at an intermediate position of other connection points.

Preferably, the first link and the second link are boomerang links.

Preferably, the third link is a straight link.

Advantageous effects of the present invention are as follow:

1) the front installation joint of the engine is integral with the pylon frame, omitting a mounting bracket, namely, omitting a docking form, so that the installation joint is directly connected to the engine fan casing via a link, thereby reducing the weight of a mounting portion of the engine;

2) the installation joint not only bears the load in the vertical direction and horizontal direction, but also bears the engine torque, thereby releasing a torque-bearing function of the rear installation joint;

3) since the front installation joint bears the torque, the width of the shape of the rear installation joint is reduced, and an engine external duct space occupied by the pylon is reduced, whereby the engine performance is improved and the engine fuel consumption rate is reduced.

BRIEF DESCRIPTION OF DRAWINGS

Other features and advantages of the present invention can be made more apparent by the following preferred embodiments described in detail with reference to figures, wherein identical reference numbers denote identical or like parts, wherein.

DETAILED DESCRIPTION OF PREFERRED EMBODIMENTS

Embodiments are described in detail below with reference to figures which constitute part of the description. The figures exemplarily exhibit specific embodiments, and the present invention is implemented in these embodiments. The shown embodiments are not intended to exhaust all embodiments according to the present invention. It may be appreciated that other embodiments may be used, and structural or logical changes can be made without departing from the scope of the present invention. Regarding figures, terms indicative of directions such as "outward" and "downward" are used with reference to orientations of the described figures. If the orientations of the figures change, these terms also change accordingly. Since assemblies of the embodiments of the present invention can be implemented in many orientations, these direction terms are used for illustration purpose not for limitation purpose. Hence, the following specific embodiments are not intended to limit the present invention, and the scope of the present invention is defined by the appended claims.

A main function of the installation joints of the present invention is to connect the engine and transfer the load of the engine to the pylon structure. A conventional engine installation manner is that the engine is connected with the pylon via the front and rear installation joints, and the torque of the engine is transferred to the aircraft pylon via the rear installation joint. The present invention, by using integrated design of the front installation joint and the pylon frame, can transfer vertical and lateral load, as well as transfer the torque. The present invention may be used to equip the engine on any type of aircraft.

Figure 1:
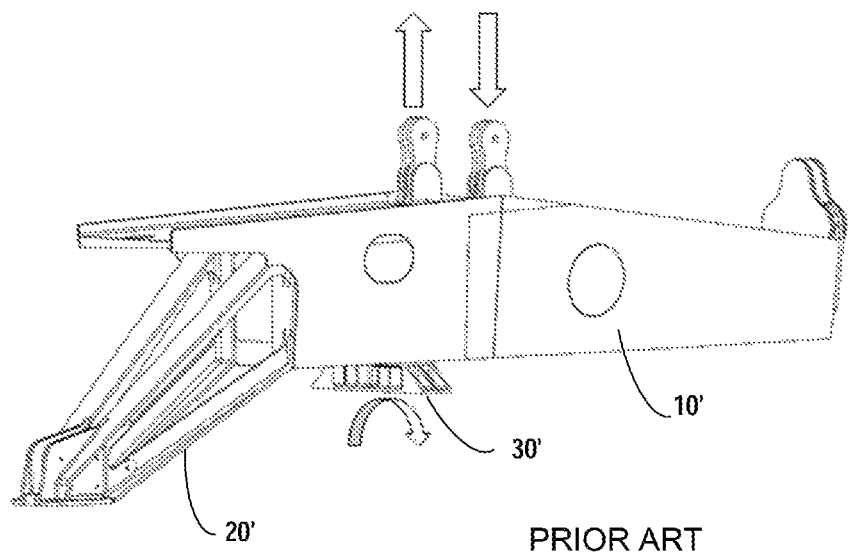
FIG. 1 is a schematic view of an aircraft pylon in a conventional configuration.
Figure 2A:
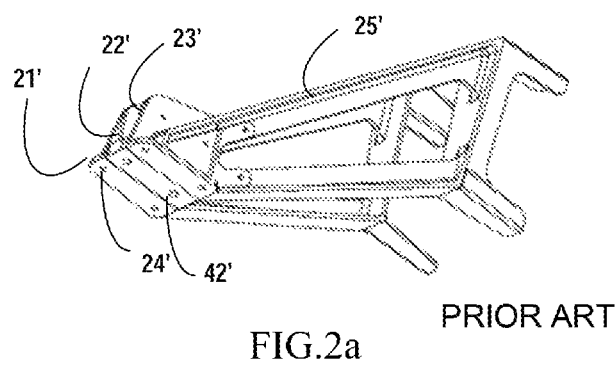
FIG. 2a is a schematic view of a front installation joint of the pylon of FIG. 1.
Figure 2B:
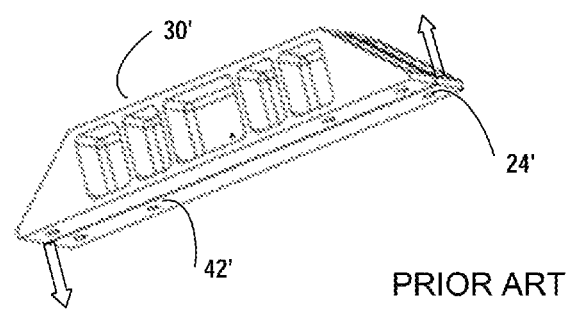
FIG. 2b is a schematic view of a rear installation joint of the pylon of FIG. 1.
Figure 3A:
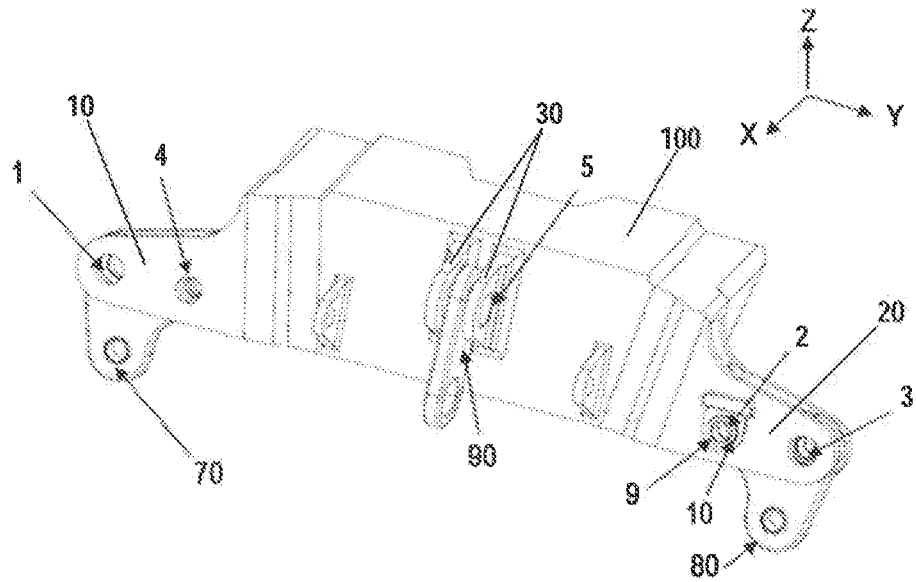
FIG. 3a is a schematic view of a front installation joint integrated with an aircraft pylon according to a preferred embodiment of the present invention, wherein a fastener for fixing a boomerang link is removed for the sake of clarity.

The front installation joint integrated with an aircraft pylon according to a preferred embodiment of the present invention is as shown in FIG. 3a. The front installation joint is adapted to be integrally formed with a front end frame 100 of the aircraft pylon and comprises a first lug 10, a second lug 20, a third lug 30, a first link 70, a second link 80, and a third link 90. The first lug 10 and the second lug 20 respectively protrude outward from both sides of the front end frame 100; and the first link. 70, the second link 80 and the third link 90 are respectively connected to the first lug 10, the second lug 20 and the third lug 30 at one end, and respectively adapted to be connected to the aero-engine at the other end. In the present embodiment, the first link and the second link are preferably boomerang links and the third link is preferably a straight link, but these links may be links in any other shapes.

Figure 3B:
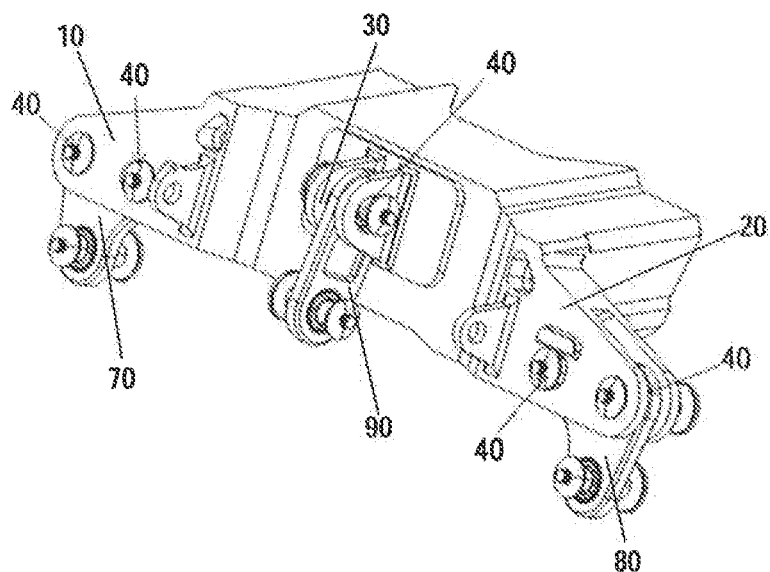
FIG. 3b is a view similar to FIG. 3a, wherein the installation joint is assembled with a fastener.

As shown in FIG. 3b, the first link 70 and the first lug 10 are connected respectively at a first connection point 1 and a fourth connection point 4, the second link 80 and the second lug 20 are connected respectively at a second connection point 2 and a third connection point 3, and the third link 90 and the third lug 30 are connected at a fifth connection point 5. In the present embodiment, the first lug, the second lug and the third lug are preferably a double-lug with a mounting hole which is provided on each lug of the double-lug at the respective connection points. A bushing 50 is mounted in each mounting hole, and a bolt hole is formed on each link at each connection point. One connecting bolt 40 is mounted on each corresponding link respectively at the first through fifth connection points 1, 2, 3, 4, 5 and runs through the bushing 50 in the mounting hole on the corresponding lugs at these connection points.

Figure 4:
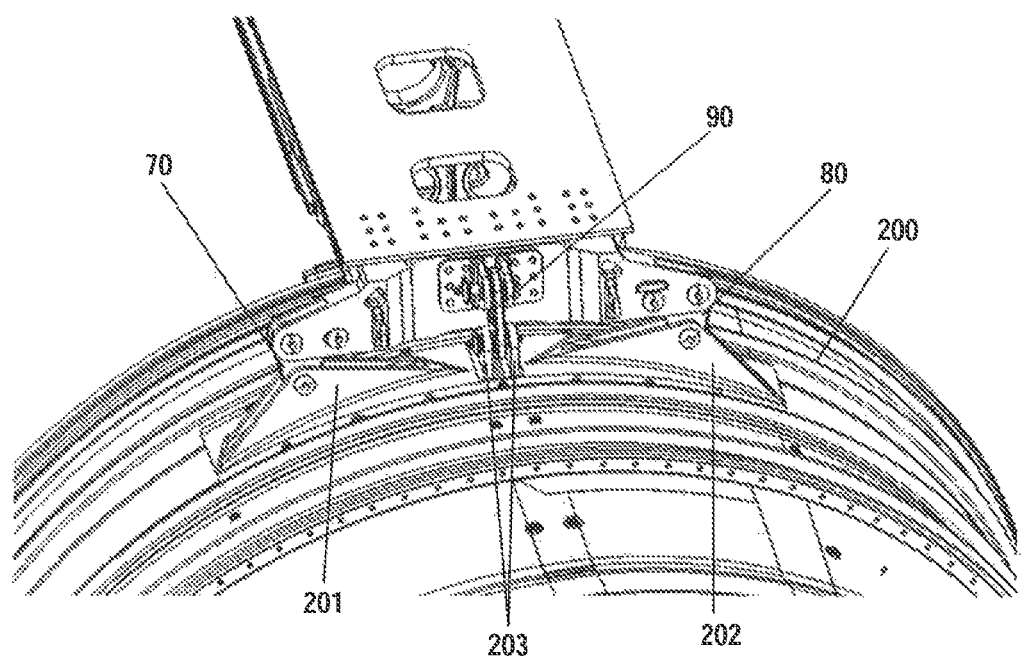
FIG. 4 is a view showing a use state wherein the front installation joint integrated with the aircraft pylon in FIG. 3a is connected to the engine.
Figure 5:
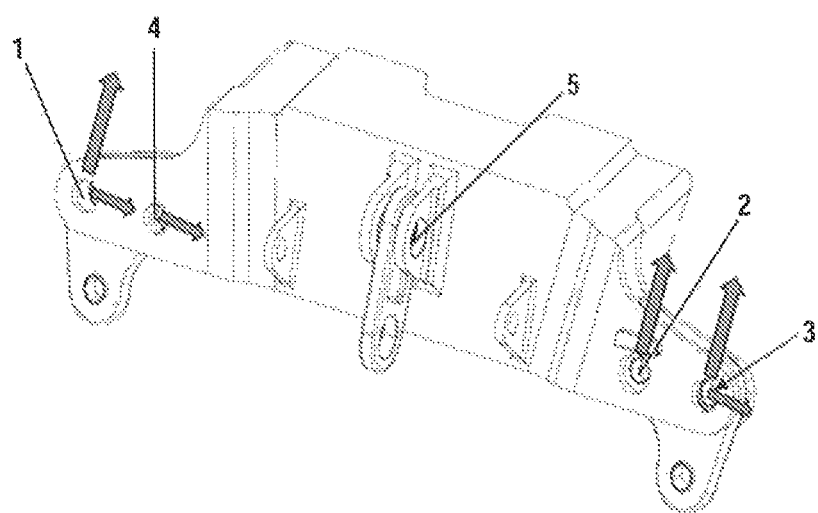
FIG. 5 is a schematic view showing reception of force of the front installation joint of FIG. 3a in a normal state.

Again as shown in FIG. 4, the front installation joint of the present embodiment is connected to a first connector 201, a second connector 203 and a third connector 205 on the engine fan casing 200 via the two boomerang links and one straight link, and the whole front installation joint and the engine have totally three connection point. The fourth connection point 4 on the first link 70 and the third link 90 are standby designs for possible damages and security purpose. That is to say, in normal working conditions, as shown in FIG. 5 and with reference to FIG. 3a, the three connection points, namely, the first connection point 1, the second connection point 2 and the third connection point 3, jointly bear a vertical load (Z direction) and a course torque (X direction) transferred from the engine, and the first connection point 1 and the third connection point 3 bears a lateral load (Y direction). When any one of the first connection point 1, the second connection point 2 and the third connection point 3 fails, the fourth connection point 4 participates in bearing the vertical load (Z direction) and lateral load (Y direction). For example, when the second connection point 2 fails, the first connection point 1, the fourth connection point 4 and the third connection point 3 jointly bear the vertical load (Z direction), lateral load (Y direction) and course torque (X direction) transferred from the engine. When the first link 70 or the whole second link 80 completely fails, i.e., both of its connection points fail, for example, when the second link 80 completely fails, the third link. 90 will participate in receiving a force, and the first connection point 1, the fourth connection point 4 and the fifth connection point 5 jointly bear the vertical load (Z direction), the lateral load (Y direction) and engine torque transferred from the engine.

Again as shown in FIG. 5, in the connection points where the first link 79 and the second link 80 are respectively connected to the first lug 10 and the third lug 30, the connecting bolt is clearance-fitted with the bushing at the first connection point 1, the second connection point 2 and the third connection point 3. Such design facilitates the mounting of the connecting bolt on the one hand, and on the other hand, under normal working conditions, the three connection points bear all loads and torques.

Figure 6A:
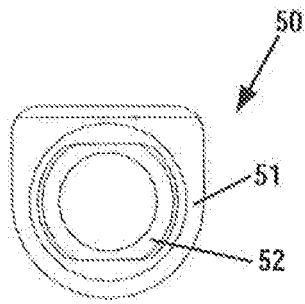
FIGS. 6a, 6b and 6c are respectively an assembling view of a bushing in a fastening hole at a second connection point of the front installation joint in FIG. 3a, a schematic view of an outer bushing, and a schematic view of an inner bushing.
Figure 6B:
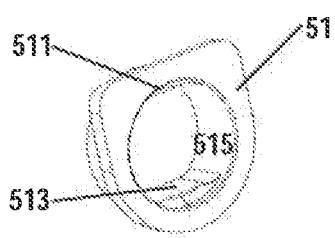
Figure 6C:
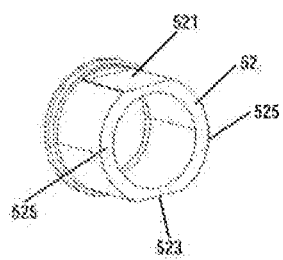

In the present embodiment, a bushing 50 at the second connection point 2 is preferably shown in FIG. 6a and comprises an outer bushing 51 and an inner bushing 52. As shown in FIGS. 6b and 6c, an outer bushing upper inner wall 511 and an outer bushing lower inner wall 513 are both configured as planes in place of curved surfaces, and an inner bushing upper outer wall 521 and an inner bushing lower outer wall 523 are planes. The inner bushing upper outer wall 521 and the inner bushing lower outer wall 523 are respectively clearance-fitted with the outer bushing upper inner wall 511 and the outer bushing lower inner wall 513 with a small clearance, and an inner bushing outer sidewall 525 that may still be a curved surface is respectively clearance-fitted with an outer bushing inner sidewall 515 that may still be a curved shape. Therefore, the second connection point 2 only transfers the vertical load and does not transfer lateral load, thus the lateral load is transferred only at the first connection point 1 and the third connection point 3, which is a statically-defined structure and transfers a force clearly. It should be appreciated that except for the busing 50 at the second connection point 2 which is relatively special, bushings at other connection points all are ordinary bushings, and connectors of these ordinary bushings themselves belong to the prior art and are not introduced here.

Figure 7:
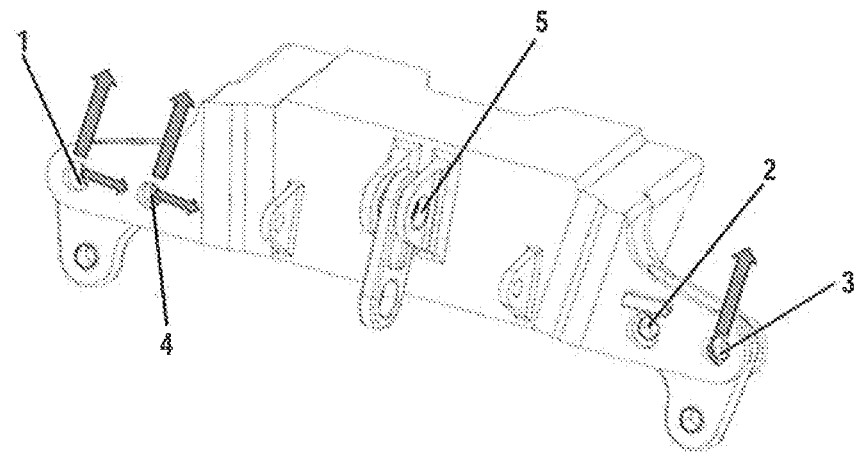
FIG. 7 is a schematic view showing reception of force of the front installation joint of FIG. 3a in a state that a second connection point fails.
Figure 8:
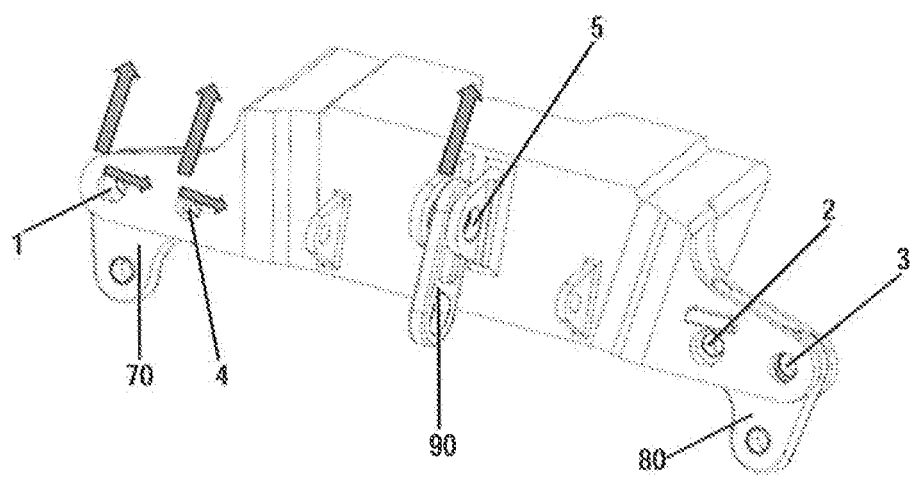
FIG. 8 is a schematic view showing reception of force of the front installation joint of FIG. 3a in a state that a second boomerang link fails.

To allow the fourth connection point 4 of the first link 70 and the third link 90 to be standby designs for possible damages and security purpose, and the fourth connection point 4 of the first link 70 to be a priority standby design for possible damages and security purpose, i.e., the fourth connection point 4 acts before the third link 90 acts, the connecting bolt 40 is clearance-fitted with the bushing at the fourth connection point 4 with a first clearance, and the connecting bolt 40 is also clearance fitted with the bushing at the fifth connection point 5 with a second clearance, but the second clearance at the fifth clearance point 5 is slightly greater than the first clearance at the fourth connection point 4. Furthermore, it should be appreciated that either the first clearance or the second clearance should be greater than the clearance between the connecting bolt and the bushing at the connection points 1, 2 and 3. Therefore, as shown in FIG. 7, when any one of the connection points 1, 2 and 3 fails, for example, when the second connection point 2 fails, due to the load of the engine, the front end frame 100 of the pylon slightly rotates about the connecting bolt 40 at the third connection point 3 as a rotation shaft so that the connecting bolt 40 at the fourth connection point 4 partially contacts with the bushing, i.e., the clearance between the connecting bolt 20 and the bushing at the fourth connection point 4 partially disappears, and the fourth connection point 4 begins to participate in receiving the force, and the connection points 1, 4 and 3 bear the vertical load, lateral load and the course torque. When the whole first link 70 or the Whole second link 80 completely fails, for example, when the second link 80 completely fails, as shown in FIG. 8, due to the load of the engine, the third link 90 is pulled downward so that the connecting bolt 20 at the fifth connection point 5 partially contacts with the hushing, i.e., this partial clearance disappears, such that the third link 90 participates in receiving the force, and the connection points 1, 4 and 5 bear the vertical load, lateral load and the course torque.

In the embodiment as shown in FIG. 3a through FIG. 8, the first connection point 1, the fourth connection point 4, the second connection point 2 and the third connection point 3 are preferably arranged in a straight line so that reverse vectors in the straight line direction offset each other. Furthermore, preferably the fourth connection point 4 and the second connection point 2 are arranged opposite to each other and respectively located inside the first connection point 1 and the third connection point 3. Besides, although in the present embodiment, the fifth connection point 5 is vertically (namely Z direction) located above other connection points 1, 2, 3 and 4 and located at an intermediate position of other connection points in a lateral direction (namely, Z direction), it should be appreciated that the fifth connection point 5 may be vertically located below other positions such as connection points 1, 2, 3 and 4 so long as the third link 90 does not receive the force after the front installation joint is connected to the engine.

As compared with the prior art, the front installation joint in the above embodiment has the following advantages:

1) the front installation joint of the engine is integral with the pylon frame, omitting a mounting bracket, namely, omitting a docking form, so that the installation joint is directly connected to the engine fan casing via a link, thereby reducing the weight of a mounting portion of the engine;

2) the installation joint not only bears the load in the vertical direction and horizontal direction, but also bears the engine torque, thereby releasing a torque-bearing function of the rear installation joint;

3) since the front installation joint bears the torque, the width of the shape of the rear installation joint is reduced, and an engine external duct space occupied by the pylon is reduced, whereby the engine performance is improved and the engine fuel consumption rate is reduced; and 4) the design of the first link and the third link enables the whole front installation joint to have a function of standby design for possible damages and security purpose.

The technical contents and technical features of specific embodiments of the present invention are already revealed as above. However, it should be appreciated that as guided by the creation idea of the present invention, those skilled in the art can make various modifications and improvements to the above-disclosed various features and combinations of features not explicitly shown here, but these variations and/or combinations all fail within the protection scope of the present invention. The above depictions of embodiments are only exemplary not restrictive,

| Reference signs: | |
|---|---|
| 10' pylon | |
| 20' front installation joint | 30' rear installation joint |
| 21' left front installation joint | 22' middle front installation joint |
| 23' right front installation joint | 25' bracket |
| 24' pull-receiving bolt hole | 42' shear pin hole |
| 100 front end frame | |
| 1 first connection point | 2 second connection point |
| 3 third connection point | 4 fourth connection point |
| 5 fifth connection point | |
| 10 first lug | 20 second lug |
| 30 third lug | 40 connecting bolt |
| 50 bushing | |
| 51 outer bushing | 52 inner bushing |
| 511 outer bushing upper inner wall | 521 inner bushing upper outer wall |
| 513 outer bushing lower inner wall | 523 inner bushing lower outer wall |
| 515 outer bushing inner sidewall | 525 inner bushing outer sidewall |
| 70 first link | 80 second link |
| 90 third link | |
| 200 engine fan casing | |
| 201 first connector | 203 second connector |
| 205 third connector | |

What is claimed is:

1. A front installation joint integrated with an aircraft pylon of an aero-engine, wherein the front installation joint is adapted to be integrally formed with a front end frame of the aircraft pylon, the front end frame having two opposite sides, and the front installation joint comprises:

a first lug and a second lug respectively protruding outward from a respective one of the two opposite sides of the front end frame; and a first link and a second link respectively connected to the first lug and the second lug at one end, and respectively adapted to be connected to the aero-engine at the other end;

wherein the first link and the first lug are pivotally connected at a first connection point, and the second link and the second lug are connected respectively at a second connection point and a third connection point;

wherein connecting bolts running through the first link and the second link respectively at the first connection point, the second connection point and the third connection point are adapted to be disposed in bushings disposed at these connection points and formed in mounting holes of the first lug and the second lug;

wherein a bushing at the second connection point includes an outer bushing located in the mounting hole and an inner bushing adapted for the connecting bolt, wherein inner walls of upper and lower ends of the outer bushing are planes, and outer walls of upper and lower ends of the inner bushing are planes, wherein the outer walls of the upper and lower ends of the inner bushing are transition-fitted with the inner walls of the upper and lower ends of the outer bushing, and an outer sidewall of the inner bushing is clearance-fitted with an inner sidewall of the outer bushing;

wherein the first link is further connected to the first lug at a fourth connection point, and the fourth connection point and the second connection point are arranged opposite to each other and respectively located inside the first connection point and the third connection point, wherein a connecting bolt running through the first link at the fourth connection point is clearance-fitted with the bushing disposed in the mounting hole of the first lug at the fourth connection point;

wherein the connecting bolt at the fourth connection point is clearance-fitted with the bushing with a first clearance, and the first clearance is set in a way that when any one of the first connection point, the second connection point and the third connection point fails, the connecting bolt at the fourth connection point partially contacts with the bushing;

a third lug protruding outward from a front wall of the front end frame and a third link having one end connected to the third lug at a fifth connection point and the other end adapted to be connected to the engine, and a connecting bolt running through the third link at the fifth connection point is clearance-fitted with a bushing disposed in a mounting hole of the third lug at the fifth connection point; and wherein the connecting bolt at the fifth connection point is clearance-fitted with the bushing with a second clearance, and the second clearance is greater than the first clearance and set in a way that when the first link or the second link completely fails, the connecting bolt at the fifth connection point partially contacts with the bushing.

2. The front installation joint integrated with an aircraft pylon according to claim 1, wherein the first connection point, the fourth connection point, the second connection point and the third connection point are arranged in a straight line.

3. The front installation joint integrated with an aircraft pylon according to claim 2, wherein the fifth connection point is longitudinally located above other connection points and transversely located at an intermediate position of other connection points.

4. The front installation joint integrated with an aircraft pylon according to claim 1, wherein the first link and the second link are boomerang links.

5. The front installation joint integrated with an aircraft pylon according to claim 1, wherein the third link is a straight link.

* * * * *